United States Patent [19]

Krahling

[11] Patent Number: 4,773,805

[45] Date of Patent: Sep. 27, 1988

[54] SAFETY COUPLING PIN

[76] Inventor: Linus P. Krahling, Lake Crystal, Minn. 56066

[21] Appl. No.: 81,021

[22] Filed: Aug. 3, 1987

[51] Int. Cl.[4] ............................................. F16B 21/00
[52] U.S. Cl. ..................................... 411/351; 24/453; 24/589; 280/507; 411/513
[58] Field of Search ................ 411/351, 354, 511–513, 411/530, 940; 280/507; 24/453, 589, 573, 239

[56] References Cited

U.S. PATENT DOCUMENTS

| 307,054 | 10/1884 | Kelly | 24/239 |
|---|---|---|---|
| 340,333 | 4/1886 | Liggett . | |
| 466,967 | 1/1892 | Schleicher . | |
| 603,196 | 4/1898 | May . | |
| 714,777 | 12/1902 | Buck | 24/239 |
| 2,180,558 | 11/1939 | Stastny . | |
| 2,454,856 | 11/1948 | Bible | 411/351 X |
| 2,482,907 | 9/1949 | Hagen | 411/351 X |
| 2,593,453 | 4/1952 | Honeycutt et al. . | |
| 2,900,864 | 8/1959 | Chapman et al. . | |
| 3,861,007 | 1/1975 | Silverman | 24/239 |
| 4,087,112 | 5/1978 | Lee, Jr. | 411/351 X |
| 4,553,891 | 11/1985 | Aubrun | 411/351 |
| 4,671,528 | 6/1987 | Thompson | 411/351 X |

FOREIGN PATENT DOCUMENTS

| 60206 | 7/1913 | Austria | 24/239 |
|---|---|---|---|
| 872889 | 4/1953 | Fed. Rep. of Germany | 411/351 |
| 2106370 | 4/1983 | United Kingdom | 24/239 |

Primary Examiner—Lloyd A. Gall
Attorney, Agent, or Firm—Donald A. Jacobson

[57] ABSTRACT

A safety coupling pin for securing a towed vehicle tongue to the towing vehicle drawbar using a shaft which is secured by a chain. A ring affixed to one end of the shaft has an opening which is normally closed by a spring loaded cylinder. The chain has one end permanently attached to the ring and the free end can be attached or disconnected to the ring through the opening by moving the cylinder. In use the shaft is inserted into aligned holes in the tongue and drawbar from the top and the chain secured under and around the tongue and drawbar by connecting the free end through the ring to secure the pin in place.

4 Claims, 1 Drawing Sheet

SAFETY COUPLING PIN

BACKGROUND OF THE INVENTION

I. Field of the Invention

This invention relates generally to a coupling pin used to secure a wheeler trailed vehicle to a wheeler tractor vehicle. A representative use is coupling an agricultural tractor and a trailed vehicle with a drawbar and tongue respectively to tow the trailed vehicle with the tractor.

II. Description of the Prior Art

There are a number of coupling devices made to attach a trailed vehicle to a tractor. In Chapman et al U.S. Pat. No. 2,900,864 a horizontal grooved latch pin is secured by a chain using an arrow-shaped opening on a latch plate to fit over a matching groove in the end of the latch pin. The weight of the chain and plate is relied upon to secure the end of the chain in place and thus hold the grooved latch pin in place.

In Stastny U.S. Pat. No. 2,180,558 a hinged bound member is inserted through a matching hole in a coupling pin and a chain secured to the hinged bound member across the hole to secure the member in place to prevent removal of the coupling pin. In Ligget U.S. Pat. No. 340,333 an axle clip is secured around the coupler using slots to hold the clip in place. In Honeycutt et al U.S. Pat. No. 2,593,453 a coupling pin is secured by a pair of U-shaped frame members which partially enclose the tongue.

In Schleicher U.S. Pat. No. 466,967 a pin is secured by a chain through eyelets secured to the pin and hinge-joint. In May U.S. Pat. No. 603,196 a coupling bolt is secured by a pin which is held in place by a spring which spans the pin and is attached to one end and fits into a recess in the opposite end of the pin.

None of the previous devices provides the combination of functions of my present device, namely a method of securing a vertical coupling pin with a chain. The chain is simple to connect and must either be removed or broken to remove the coupling pin.

SUMMARY OF THE INVENTION

A safety coupling pin for use with a drawbar has a chain retainer which must be removed in order to remove the pin from the drawbar. The chain is secured by an open ring which in turn is attached to a circular disk which is also affixed to the top of a shaft. This shaft is used to couple two vehicles through holes in a drawbar and vehicle tongue. A spring loaded cylinder is used to close the opening in the ring. This opening is in a portion of the ring generally opposite the shaft. The chain has one end normally secured to the ring adjacent the cylinder with the opposite end free to be inserted through the gap in the ring to secure the opposite end of the chain. In use, the shaft of the pin is first inserted through aligned holes in the aligned tongue of the trailed vehicle and through the towing vehicle drawbar. The ring is opened by manually forcing the cylinder against the spring. The free end of the chain is then led around and under the drawbar and tongue to the opposite side where the free end is secured. The free end of the chain is secured by placing the last link over the ring through the open gap and the cylinder released to allow the spring to return the cylinder to its original position to close the gap in the ring and capture the free end of the chain.

The chain is sized such that after both ends of the chain are attached through the ring the reach of the chain is less than the length of the shaft. When the chain is secured around the tongue and drawbar, the shaft cannot be pulled free from the drawbar or tongue without breaking either the chain, the ring, the disk, the shaft, or the attachment between these parts. Any force on the shaft tending to remove the shaft from the drawbar and tongue will also pull the chain downward to that portion of the ring near the disk away from the gap, consequently this force cannot act upon the cylinder. Consequently, the cylinder completing the ring gap need only be strong enough to secure the chain in place against relatively small acceleration forces and need not have the strength which would be required to secure the chain against forces acting between the vehicles themselves. The pin, disk, chain and the strength of their attachment must be able to withstand any forces tending to remove the pin from the drawbar when the vehicle is towed. When this requirement is met, the pin can be removed only by reversing the attachment sequence, namely by forcing the cylinder against the spring to open the gap in the ring and then removing one end of the chain from the ring to permit removing the securing chain from around the drawbar and tongue and subsequently freeing the shaft from the vehicles.

DESCRIPTION OF THE PREFERRED EMBODIMENT

Figure 1:
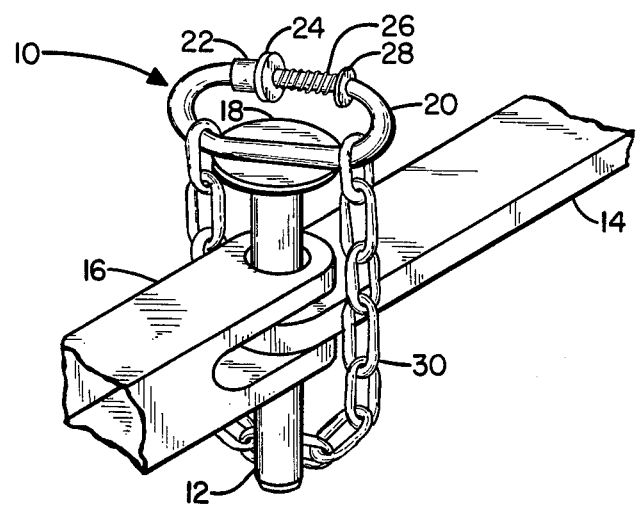
FIG. 1 is an isometric view of the pin secured to a drawbar and vehicle tongue.

In FIG. 1 safety coupling pin 10 with attachment shaft 12 is mounted through matching holes in a drawbar 14 and a vehicle tongue 16. Safety coupling pin 10 has a disk 18 attached to the top of shaft 12 with a ring 20 secured to the top of the disk. Shaft 12 has a tapered end to permit easy insertion. A cylinder 22 with a flange 24 on the end which is adjacent to a spring 26 is mounted around ring 20. Cylinder 22 and flange 24 have a central bore large enough such that these parts will slide readily on ring 20. A washer 28 is affixed around ring 20 as a stop for spring 26. Spring 26 bears against flange 24 and washer 28 to urge cylinder 22 leftward to close a gap in ring 20, not shown in this figure. A chain 30 has the end links secured by ring 20 on each end and is looped around drawbar 14 and tongue 16.

This is the placement of chain 30 for safety coupling pin 10 in normal use. In this arrangement shaft 12 cannot be removed from the holes in drawbar 14 or tongue 16 without breaking chain 30 or one of the other parts or forcing the parts free, further, any upward force on shaft 12 to dislodge the shaft will pull chain 30 downward away from cylinder 22 to where ring 20 is continuous.

Figure 3:
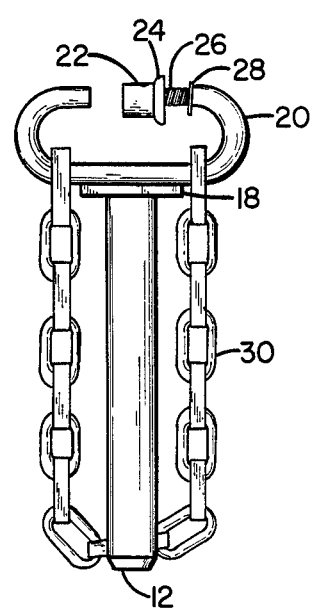
FIG. 3 is a front view of the pin with the ring gap open.

In FIG. 3 cylinder 22 is shown forced rightward against spring 26 compressing the spring and exposing a gap in ring 20. With cylinder 22 in this position the left link of chain 30 can readily be removed or reattached to ring 20. The opposite right link of chain 30 is always secured about ring 20 as it is held in place by washer 28 and disk 18.

Figure 2:
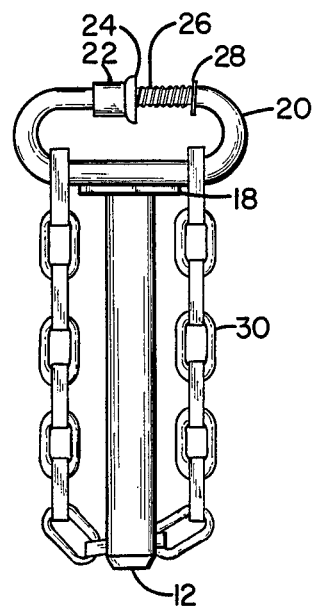
FIG. 2 is a front view of the pin with the ring gap closed.

In FIG. 2 cylinder 22 is shown urged leftward by spring 26 bearing against flange 24 and closing the gap in ring 20. With cylinder 22 in this position chain 30 cannot be removed from ring 20 without breaking chain 30, one of the other parts of safety coupling pin 10, or the connection between the parts.

In use the holes in drawbar 14 and tongue 16 are aligned and shaft 12 inserted, as shown in FIG. 1. Cylinder 22 is then forced against spring 26 by hand to expose the gap in ring 20, shown in FIG. 3, and chain 30 led around under drawbar 14 and tongue 16, as shown in FIG. 1, and the free link of the chain coupled to the opposite side of ring 20, as shown in FIG. 3.

Cylinder 22 is then released to permit spring 26 to urge cylinder 22 over the gap in ring 20 as shown in FIG. 2. Safety coupling pin 10 is now secured as shown in FIG. 1 and cannot be removed, as stated earlier, without breaking parts of the pin or by reversing the above procedure to open the gap and remove the free end of chain 30.

In the preferred embodiment shaft 12, disk 18, ring 20, cylinder 22, flange 24, washer 28 and chain 30 are made of steel. Disk 18 is welded to ring 20 and shaft 12 and washer 28 is welded to ring 20. Flange 24 can be formed by upsetting cylinder 22 to form the enlarged flange. Spring 26 is made of spring steel with a spring constant adequate to insure that cylinder 22 will be forced over the gap in ring 20. The parts of safety coupling pin 10 can be made as strong as necessary for any given application. Disk 18 provides a wear point for chain 30 rather than ring 20 to protect the ring from wear, provides spacing for the chain 30 and additional support in the attachment of the ring to shaft 12. Note however that disk 18 can be eliminated and safety coupling pin 10 would function as before. This device is extremely simple both in its construction and use.

What is claimed is:

1. A safety coupling pin comprised of:
   (a) a shaft;
   (b) an open ring with a gap attached to one end of said shaft, said gap oriented generally opposite said shaft with said shaft and said ring lying generally in the same plane;
   (c) closure means for said gap;
   (d) a flexible member having a loop on one end dimensioned to fit through said ring gap with the opposite end attached to said ring, said flexible member of a length such that when said loop is secured around said ring the span of said flexible member is less than the length of said shaft.

2. The safety coupling pin as in claim 1 wherein said closure means for said gap consists of:
   (a) a cylinder having a flange on one end mounted around said ring adjacent said gap with said flange opposite said ring gap and with said cylinder having such a size and shape and said ring adjacent said gap being shaped such that said cylinder will readily slide over said ring adjacent said gap;
   (b) a spring mounted around said ring adjacent said flange, said spring being dimensioned such that said spring can slide about said ring and will bear against said flange;
   (c) a washer attached about said ring oriented generally perpendicular to the surface of said ring, with said cylinder length and said washer location dimensioned such that said spring can urge said cylinder to completely close said gap in said ring.

3. The safety coupling pin as in claim 2 wherein said flexible member consists of a chain.

4. The safety coupling pin as in claim 3 and further including a disk attached between and to said shaft and said ring, with said disk oriented generally perpendicular to said shaft and generally centered on said shaft.

* * * * *